(12) United States Patent
Perlman

(10) Patent No.: US 7,236,204 B2
(45) Date of Patent: Jun. 26, 2007

(54) SYSTEM AND METHOD FOR RENDERING GRAPHICS AND VIDEO ON A DISPLAY

(75) Inventor: Stephen G. Perlman, Palo Alto, CA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/792,019

(22) Filed: Feb. 20, 2001

(65) Prior Publication Data

US 2002/0135696 A1 Sep. 26, 2002

(51) Int. Cl.
*H04N 7/01* (2006.01)

(52) U.S. Cl. ..................................... 348/448

(58) Field of Classification Search ............... 348/441, 348/446, 448, 452, 455, 458, 459, 581; 345/698, 345/699
See application file for complete search history.

(56) References Cited

U.S. PATENT DOCUMENTS

| | | | |
|---|---|---|---|
| 5,347,314 A * | 9/1994 | Faroudja et al. ............. | 348/448 |
| 5,610,661 A * | 3/1997 | Bhatt ........................... | 348/446 |
| 5,646,693 A | 7/1997 | Cismas | |
| 5,701,161 A * | 12/1997 | Williams et al. ............. | 348/468 |
| 5,745,909 A | 4/1998 | Perlman et al. | |
| 5,777,683 A | 7/1998 | Park et al. | |
| 5,784,047 A | 7/1998 | Cahill, III et al. | |
| 5,790,113 A | 8/1998 | Perlman et al. | |
| 5,838,873 A | 11/1998 | Blatter et al. | |
| 5,864,369 A * | 1/1999 | Swan ........................... | 348/448 |
| 5,943,036 A * | 8/1999 | Tanaka ........................ | 345/136 |
| 6,055,018 A * | 4/2000 | Swan ........................... | 348/448 |
| 6,073,168 A | 6/2000 | Mighdoll et al. | |
| 6,084,568 A | 7/2000 | Premi et al. | |
| 6,141,693 A | 10/2000 | Perlman et al. | |
| 6,166,773 A * | 12/2000 | Greggain et al. ............ | 348/448 |
| 6,173,296 B1 | 1/2001 | Perlman et al. | |
| 6,195,086 B1 | 2/2001 | Perlman et al. | |
| 6,198,773 B1 | 3/2001 | Gill et al. | |
| 6,208,350 B1 * | 3/2001 | Herrera ....................... | 345/582 |
| 6,256,068 B1 * | 7/2001 | Takada et al. .............. | 348/441 |
| 6,283,933 B1 * | 9/2001 | Ritter ........................... | 348/447 |
| 6,307,566 B1 * | 10/2001 | Hill et al. .................... | 345/613 |
| 6,317,885 B1 * | 11/2001 | Fries .......................... | 725/109 |

(Continued)

FOREIGN PATENT DOCUMENTS

WO WO 96/08912 3/1996

(Continued)

*Primary Examiner*—Paulos M. Natnael
(74) *Attorney, Agent, or Firm*—Kory D. Christensen; Stoel Rives, LLP

(57) ABSTRACT

A method for properly rendering various types of graphical and video content is disclosed comprising: determining whether a display on which the content is to be displayed is a progressive or an interlaced display; for a progressive display, de-interlacing any interlaced source content, transforming any bitmapped source content to fit the progressive display's resolution and/or scaling factors, and geometrically rendering any source content in a geometric description format into a bitmap image to fit the progressive display's resolution and/or scaling factors; and for an interlaced display, if the interlaced source content is not provided at the interlaced display's resolution and/or scaling factors, de-interlacing the interlaced source content to produce de-interlaced source content, and transforming the de-interlaced source content to fit the interlaced display's resolution and/or scaling factors.

16 Claims, 5 Drawing Sheets

U.S. PATENT DOCUMENTS

| | | | |
|---|---|---|---|
| 6,380,978 B1 * | 4/2002 | Adams et al. | 348/452 |
| 6,459,453 B1 * | 10/2002 | Deming et al. | 348/446 |
| 6,504,577 B1 | 1/2003 | Voltz et al. | |
| 6,505,299 B1 | 1/2003 | Zeng et al. | |
| 6,522,339 B1 * | 2/2003 | Orimo | 345/606 |
| 6,529,244 B1 * | 3/2003 | Hrusecky | 348/453 |
| 6,556,193 B1 * | 4/2003 | Auld et al. | 345/418 |

FOREIGN PATENT DOCUMENTS

| | | |
|---|---|---|
| WO | WO 98/07274 | 2/1998 |
| WO | WO 99/17528 | 4/1999 |

\* cited by examiner

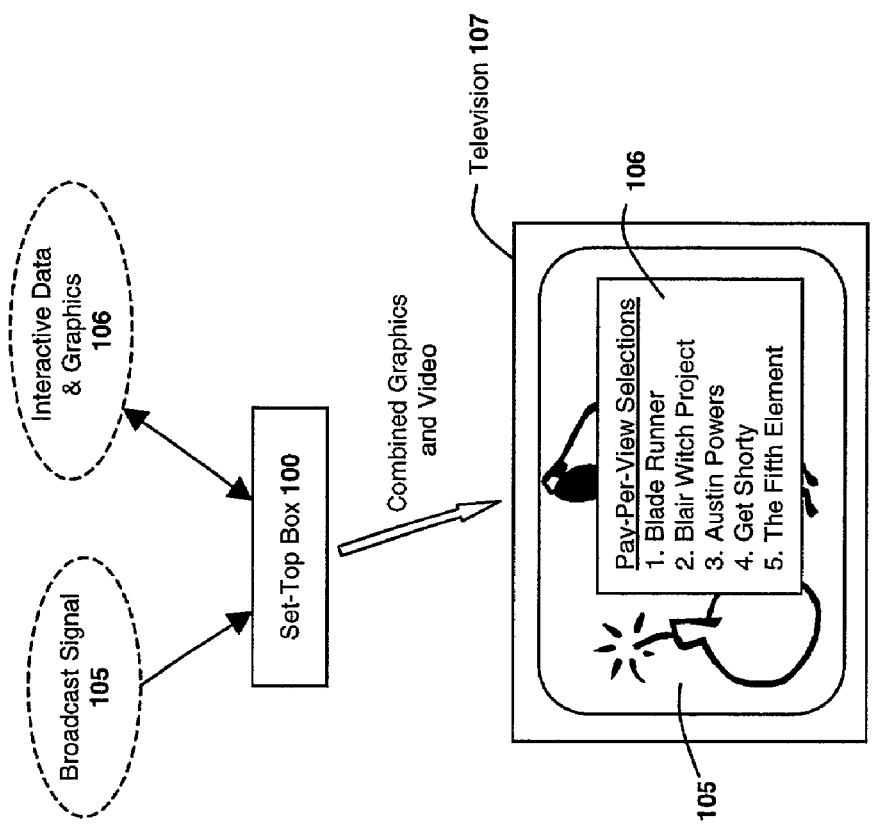
FIG. 1a *(prior art)*

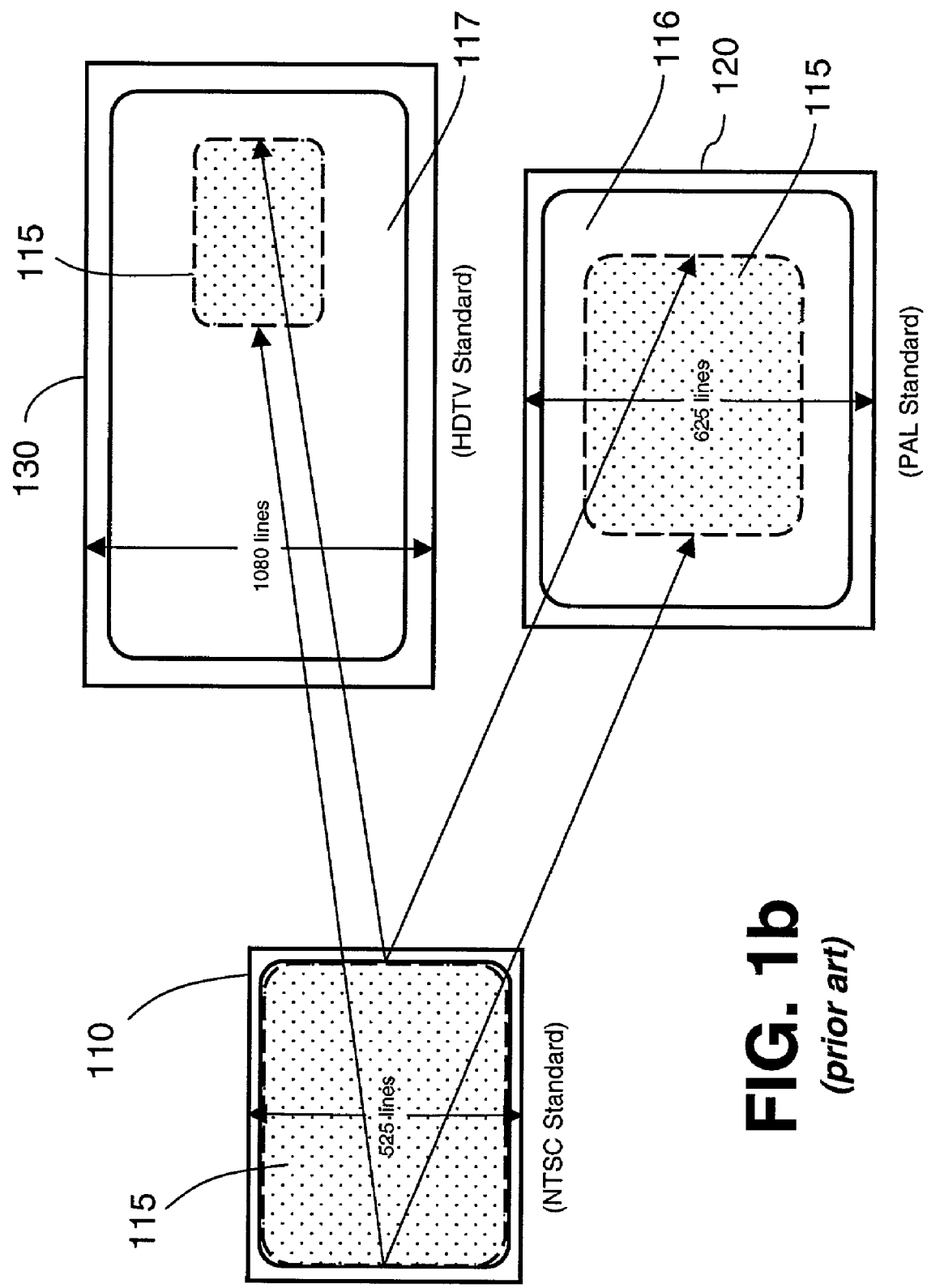
FIG. 1b *(prior art)*

US 7,236,204 B2

SYSTEM AND METHOD FOR RENDERING GRAPHICS AND VIDEO ON A DISPLAY

BACKGROUND

1. Field of the Invention

This invention relates generally to the field of multimedia systems. More particularly, the invention relates to a multimedia system capable of dynamically processing and combining different graphics and video using an appropriate resolution, aspect ratio, and interlaced/progressive scan type.

2. Description of the Related Art

Various prior art systems have been developed which render graphics on television displays. For example, as illustrated in FIG. 1a, set top boxes 100 from companies such as Web TV®, Replay TV® and Tivo® allow users to view various types of interactive graphical content 106 (e.g., Web pages, program menus, . . . etc), either displayed separately or overlayed on top of the standard broadcast video signal 105. The graphical content 106 may be transmitted along with the primary broadcast signal 105 (e.g., embedded within the signal's vertical blanking interval ("VBI")), or over a separate data network such as the Internet (e.g., via a DSL modem, a cable modem or a standard telephone modem configured within the set top box 100, depending on the particular Internet service subscribed to by the end user).

One problem which exists with current systems, however, is that graphics designed for one type of display device may not be rendered properly on a different type of display device. For example, as illustrated in FIG. 1b, a graphical bitmap 115 designed to fit perfectly within a National TV Standards Committee ("NTSC") television screen will have a resolution of less than 525 lines. The resolution of the bitmap image 115 is typically less than the maximum defined NTSC resolution of 525 lines (e.g., 420 lines) due to overscanning which occurs in standard television sets (i.e., some of the transmitted image is not viewable because the electron gun within the television scans slightly above and below the viewable portion of the picture tube).

When the same graphical bitmap 115 is displayed on a television 120 designed to render a Phase Alternating Line ("PAL") signal, however, the image will no longer occupy the area which it was meant to occupy (e.g., the entire area in the example shown in FIG. 1b). Rather, because PAL provides a resolution 625 lines, an unsightly border 116 will surround the graphical bitmap 115. Similarly, when the graphical bitmap 115 is displayed on a high definition television ("HDTV") 120, capable of rendering images at 1080 interlaced lines at an aspect ratio of 16:9, an even larger, asymmetrical border 117 will be produced.

Accordingly, what is needed is a system and method which will properly display graphics and video, regardless of the resolution and aspect ratio of the display device. What is also needed is a system and method which will convert, combine and render different graphics and video images for proper display on the display device. What is also needed is a system and method which will work with both interlaced and progressive display devices.

SUMMARY OF THE INVENTION

A method for properly rendering various types of graphical and video content is disclosed comprising: determining whether a display on which the content is to be displayed is a progressive or an interlaced display; for a progressive display, de-interlacing any interlaced source content, transforming any bitmapped source content to fit the progressive display's resolution and/or scaling factors, and geometrically rendering any source content in a geometric description format into a bitmap image to fit the progressive display's resolution and/or scaling factors; and for an interlaced display, if the interlaced source content is not provided at the interlaced display's resolution and/or scaling factors, de-interlacing the interlaced source content to produce de-interlaced source content, and transforming the de-interlaced source content to fit the interlaced display's resolution and/or scaling factors.

BRIEF DESCRIPTION OF THE DRAWINGS

A better understanding of the present invention can be obtained from the following detailed description in conjunction with the following drawings, in which:

FIG. 1a illustrates a prior art multimedia system capable of receiving and rendering broadcast video and graphics.

FIG. 1b illustrates problems associated with displaying graphical images on various television types.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Figure 2:
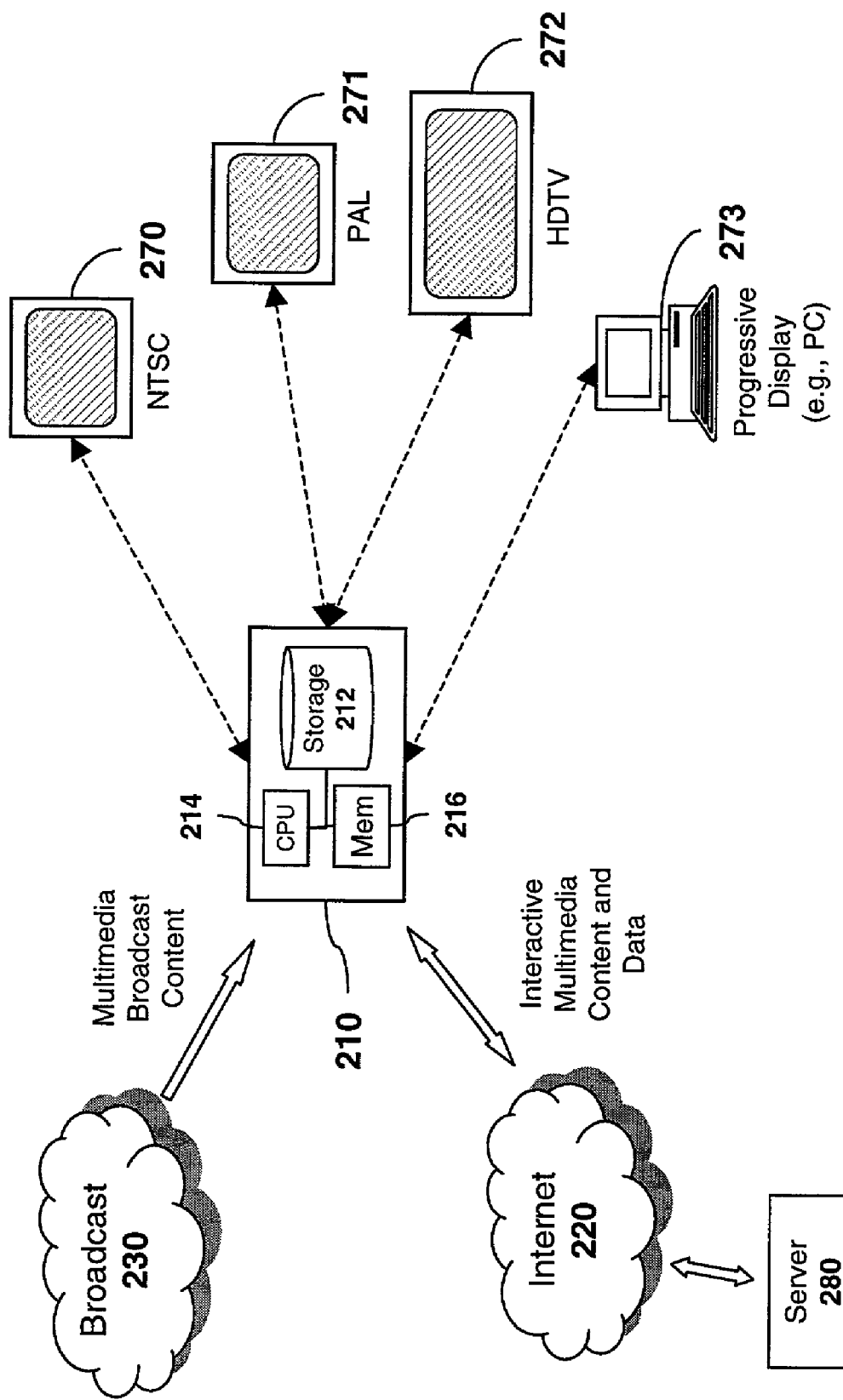
FIG. 2 illustrates one embodiment of a system for implementing the method of FIG. 3a and 3b.

Embodiments of a System and Method for Rendering Graphics and Video on a Display As illustrated in FIG. 2, in one embodiment of the invention, a multimedia and data processing system 210 (e.g., a "set-top box") equipped with a processor, a memory and a mass storage device acts as a central repository for processing, storing and distributing multimedia content and data. More particularly, the multimedia and data processing system 210 combines various types of multimedia and graphical content from Internet communication channels 220 (e.g., from server 380 over DSL or cable Internet channels) and broadcast communication channels 230 (e.g., digital/analog cable, satellite) to render an accurate multimedia presentation on one or more display devices 270-273. As illustrated, the display devices may include interlaced devices such as NTSC, PAL and HDTV televisions 270-272, respectively, and non-interlaced (i.e., "progressive") devices such as personal computers 273 and some HDTV televisions.

As mentioned above, one embodiment of the system 210 includes a central processing unit 214 capable of processing data and multimedia content stored in a main memory 216, and a mass storage device 212 for storing data and multimedia content. In one embodiment, the central processing unit 214 is a Pentium®-class processor such as a Pentium III® operating at a 1 GHz or faster clock frequency. However, the underlying principles of the invention are not limited to any particular processor speed or processor type. The main memory 216 may be a random access memory or any other dynamic storage medium (e.g., SDRAM, DDRAM, RD-RAM, . . . etc).

The mass storage device 212 of one embodiment is capable of storing hundreds, or even thousands of hours of multimedia content (e.g., movies, digital audio content . . . etc) as well as other types of digital data (e.g., Web page, computer programs, word processing documents, . . . etc). System components may transmit and receive data to/from the mass storage device 212 over a high speed interface such as an enhanced IDE interface with Ultra DMA capabilities or a Small Computer System Interface ("SCSI"). However, various other interfaces may be employed while still complying with the underlying principles of the invention.

An application-specific integrated circuit ("ASIC") (not shown) may also be included within one embodiment of the system 210 to coordinate communication between the various system components and offload certain designated processing tasks from the CPU (e.g., real-time decompression of MPEG-2 video content). The ASIC may be custom built based on the requirements of the home media server 110 or may be built using gate arrays, standard cells or programmable logic devices.

The system may also be configured with communication modules (not shown) for transmitting/receiving data over local and remote communication channels. As is known in the art, these may include, for example, tuners and quadrature amplitude modulation ("QAM") modules for receiving and demodulating broadcast cable/satellite channels and modems for communicating over the Internet (e.g., cable modems, digital subscriber line modems, . . . etc). Various other types of communication modules may be configured within the system 210 (e.g., local area network communication modules) while still complying with the underlying principles of the invention.

In order to solve the problems associated with rendering graphics on displays with different resolutions, in one embodiment of the invention, graphics are transmitted to the end user in an "outline" description format (also referred to as a "geometric" description format) rather than a bitmapped format. The graphical description uses display ratios (i.e., percentages), rather than raw dimensional data to render graphics. For example, bitmapped image data may specify a rectangle of 640 pixels by 480 pixels to be drawn on a display. As such, the image will take up a different portion of the overall display area on a PAL display than on an NTSC display (as illustrated in FIG. 1b). By contrast, a geometric description of the rectangle image may specify, for example, that the rectangle should take up 90% of the display width and 90% of the display height, and should be centered on the display. Accordingly, the image will be displayed in roughly the same manner, regardless of the resolution of the display.

For displays having different aspect ratios such as the HDTV illustrated in FIG. 1b, one embodiment of the system will allow the user to select between stretching the image to fit within the HDTV display, cropping the image horizontally to fit within the HDTV display, and/or positioning the image within the HDTV display to allow room for a second image to be displayed concurrently (e.g., the video program with which the graphical image is associated). One embodiment of the invention will distort the image to fit within different aspect ratio displays, both interlaced (e.g., 1080$i$) and non-interlaced (e.g., 720$p$), in response to a user selection.

Figure 3A:
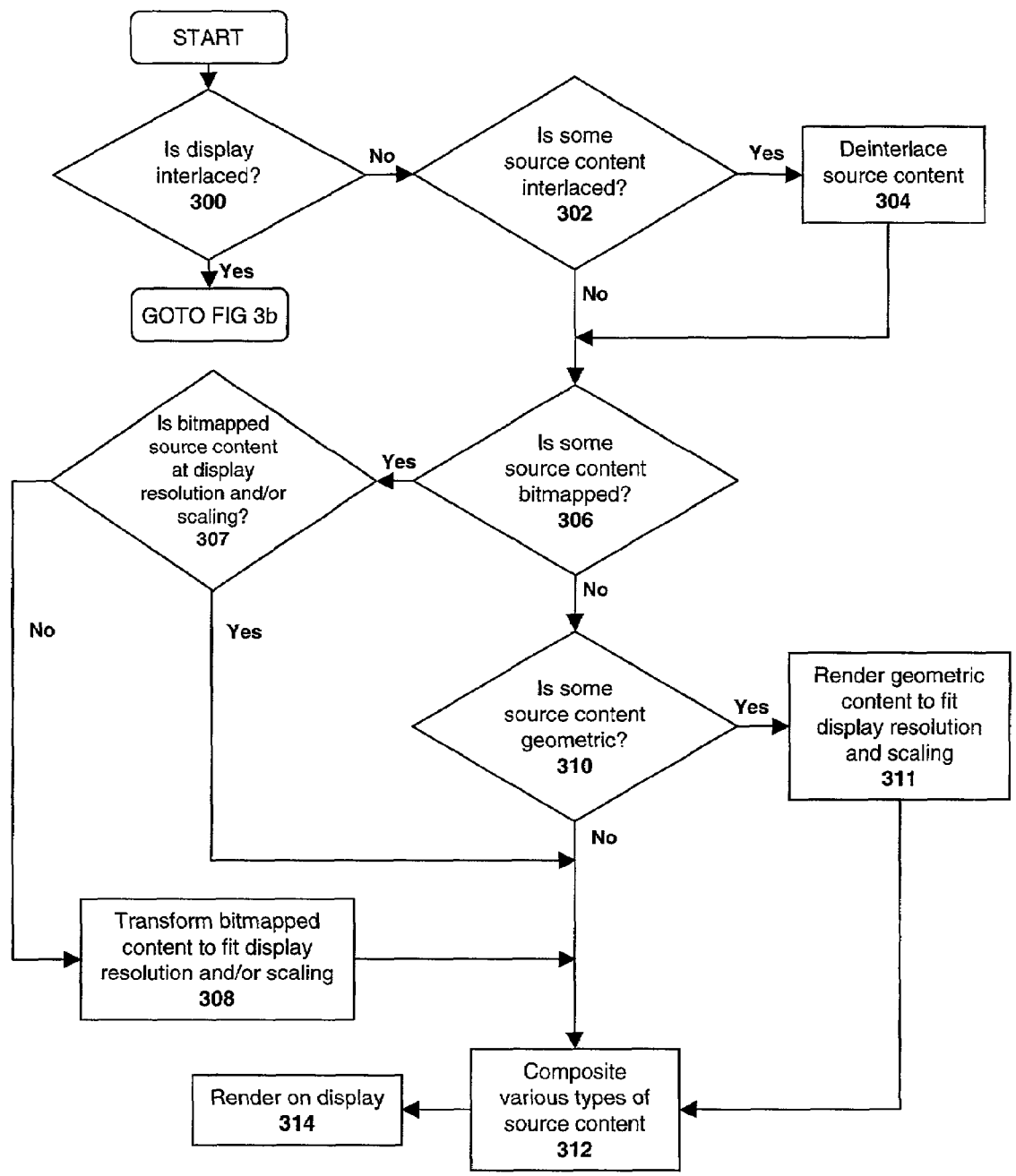
FIG. 3a illustrates a method for processing video and graphical content according to one embodiment of the invention.
Figure 3B:
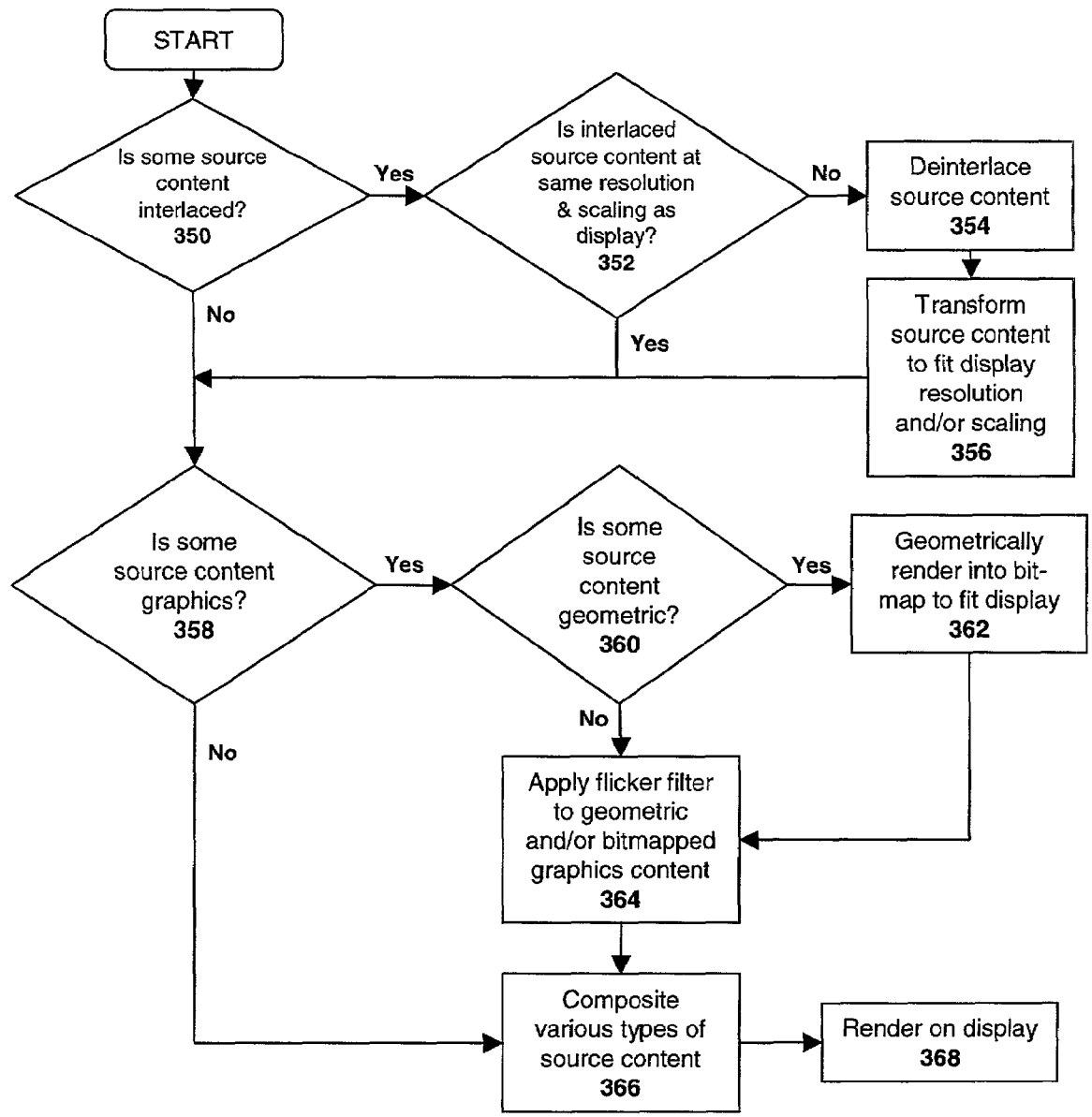
FIG. 3b illustrates a method for processing video and graphical content for an interlaced display according to one embodiment of the invention.

One embodiment of a method for combining and rendering different types of graphics and video on a display (e.g., both bitmapped and geometrically described images) is illustrated in FIGS. 3a-b. The method may be implemented on the systems described above or, alternatively, may be implemented on virtually any other system capable of receiving and processing multimedia content and data (i.e., in software, hardware, firmware or any combination thereof).

At 300 (FIG. 3a) the system initially determines whether the display on which the multimedia content is to be rendered is interlaced or non-interlaced. As is known in the art, to produce an image on an interlaced display, the odd lines on the display are drawn first, followed by the even lines. By contrast, to produce an image on a non-interlaced or "progressive" display, the lines are drawn in succession (i.e., $1^{st}, 2^{nd}, 3^{rd}, \ldots$ etc). Televisions use interlaced displays whereas most computers use progressive displays. If the display is interlaced, the method proceeds to FIG. 3b (described below). If the display is not interlaced, at 302 the system analyzes the source content to determine whether any of the source content is in an interlaced format. If it is, then at 304 the system deinterlaces the source content (e.g., using one of the many deinterlacing techniques known in the art).

The analysis of the source content proceeds to 306, where the system determines whether any of the source content is bitmapped. If so, then at 307 it determines whether the bitmapped content was produced for the same resolution and/or scaling format as the display. If not, then at 308 the bitmapped content is transformed to fit the display resolution and/or scaling factors (e.g., using resolution/scaling transformation techniques known in the art). As described above, for displays with different aspect ratios, users may also configure the system to stretch the bitmapped image to fit the new aspect ratio (e.g., either distorting or not distorting the image), crop the image to fit horizontally or vertically, or display the image in it's original format in a specified area of the display.

At 310, if some source content is geometric, then at 311 the system renders the geometric content to fit the display resolution and scaling (as described above). Finally, at 312, all of the different types of video and graphical content are composited to produce the final image which is rendered on the non-interlaced display (at 314). Various compositing techniques may be employed. For example, one embodiment of the invention using aliased techniques will replace background pixels with foreground pixels in a frame buffer or scan-line buffer. Alternatively, using anti-aliased techniques, foreground and background pixels are blended in accordance with their pixel coverage contribution. More advanced anti-aliasing techniques consider coverage of adjacent pixels as filtered using a 2-dimentional filter matrix. All of these techniques are well-known in the art.

As mentioned above, if the display on which the content will be rendered is interlaced (e.g., an NTSC television), then the method proceeds to FIG. 3b. At 350, the system determines whether any of the source content is interlaced (e.g., a broadcast television signal) if so, then at 352 the system compares the resolution and/or scaling of the display with the resolution and/or scaling of the source content. If the source content is not at the same resolution and/or scaling as the display, then at 354 the source content is deinterlaced (e.g., using one or more deinterlacing techniques known in the art) and, at 356, the source content is transformed to match the display resolution and/or scaling.

At 358, the system determines whether any of the source content is graphical content. If not (i.e., if the source content is video) then the process proceeds directly to 366 where the video is composited and rendered on a display at 368. If some source content is graphical content, however, then at 360 the system determines whether any of the content is geometric content. If so, then at 362, the geometric content is geometrically rendered into a bitmap to fit the desired display resolution and aspect ratio. At 364 a flicker filter is applied to the graphics content. Flicker filters are used to reduce image flicker when displaying progressive images on an interlaced display. Interlaced displays refresh, or update their images, at a significantly slower rate than personal computer displays. Accordingly, when images created for progressive displays (e.g., PC monitors) are rendered on interlaced screens, the human eye detects the lower refresh rate, causing the computer-rendered images to appear to "flicker." A flicker filter is not typically required for video content because such a filter is employed during the video production process. Finally, at 366, the various types of video and/or graphics content are composited together and at 368, the final images are rendered on a display. Using the foregoing techniques, various types of video and graphics content, both geometric and bit-mapped content, may be properly rendered on interlaced and progressive displays at virtually any aspect ratio.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. In other instances, well known structures and functions were not described in detail in order to avoid obscuring the subject matter of the present invention. Accordingly, the scope and spirit of the invention should be judged in terms of the claims which follow.

What is claimed is:

1. A method for rendering source content on an interlaced display comprising:
   if a portion of said source content is interlaced source content, determining whether said interlaced source content is provided at said interlaced display's resolution and/or scaling factors; and
   if said interlaced source content is not provided at said interlaced display's resolution and/or scaling factors,
   de-interlacing said interlaced source content to produce de-interlaced source content, and
   transforming said de-interlaced source content to fit said interlaced display's resolution and/or scaling factors; and
   if a portion of said source content is graphics content, determining whether any of said graphics content is in a geometric description format; and
   geometrically rendering said graphics content in said geometric description format into a bitmap image to fit said interlaced display's resolution and/or scaling factors.

2. The method as in claim 1 further comprising:
   applying a flicker filter to said graphics content.

3. The method as in claim 2 further comprising:
   compositing said graphics content with any existing video source content to produce a final image; and
   displaying said final image on said interlaced display.

4. A method for rendering source content on a progressive display comprising:
   de-interlacing any interlaced source content;
   transforming any bitmapped source content to fit said progressive display's resolution and/or scaling factors; and
   geometrically rendering any source content in a geometric description format into a bitmap image to fit said progressive display's resolution and/or scaling factors.

5. The method as in claim 4 further comprising:
   compositing said all of said source content to produce a final image; and
   displaying said final image on said progressive display.

6. A system for rendering a plurality of different types of graphics and video source content on an interlaced display comprising:
   de-interlacing means for de-interlacing any interlaced source content to produce de-interlaced source content if said interlaced source content is not provided at said interlaced display's resolution and/or scaling factors;
   transformation means transforming said de-interlaced source content to fit said interlaced display's resolution and/or scaling factors; and
   graphics determination means for determining whether any of said graphics content is in a geometric description format.

7. The system as in claim 6 further comprising:
   geometric rendering means for geometrically rendering said graphics content in said geometric description format into a bitmap image to fit said interlaced display's resolution and/or scaling factors.

8. The system as in claim 7 further comprising:
   flicker filter means for filtering said graphics content.

9. The system as in claim 8 further comprising:
   compositing means for compositing said graphics content with any existing video source content to produce a final image; and
   display means for displaying said final image on said interlaced display.

10. A system for rendering source content on a progressive display comprising:
- de-interlacing means for de-interlacing any interlaced source content;
- transformation means for transforming any bitmapped source content to fit said progressive display's resolution and/or scaling factors; and
- geometric rendering means for geometrically rendering any source content in a geometric description format into a bitmap image to fit said progressive display's resolution and/or scaling factors.

11. The system as in claim 10 further comprising:
- compositing means for compositing said all of said source content to produce a final image; and
- display means for displaying said final image on said progressive display.

12. A method for properly rendering various types of graphical and video content comprising:
- determining whether a display on which said content is to be displayed is a progressive or an interlaced display;
- for a progressive display, de-interlacing any interlaced source content, transforming any bitmapped source content to fit said progressive display's resolution and/or scaling factors, and geometrically rendering any source content in a geometric description format into a bitmap image to fit said progressive display's resolution and/or scaling factors; and
- for an interlaced display, if said interlaced source content is not provided at said interlaced display's resolution and/or scaling factors, de-interlacing said interlaced source content to produce de-interlaced source content, and transforming said de-interlaced source content to fit said interlaced display's resolution and/or scaling factors.

13. The method as in claim 12 further comprising:

compositing said all of said source content to produce a final image; and displaying said final image on said progressive display.

14. The method as in claim 12 further comprising:

for a progressive display, if a portion of said source content is graphics content, determining whether any of said graphics content is in a geometric description format; and geometrically rendering said graphics content in said geometric description format into a bitmap image to fit said interlaced display's resolution and/or scaling factors.

15. The method as in claim 14 further comprising:

applying a flicker filter to said graphics content.

16. The method as in claim 15 further comprising:

compositing said graphics content with any existing video source content to produce a final image; and displaying said final image on said interlaced display.

* * * * *